United States Patent
Takahashi

(10) Patent No.: US 12,050,466 B2
(45) Date of Patent: Jul. 30, 2024

(54) TRAVELING APPARATUS, CONTROL METHOD, AND NON-TRANSITORY COMPUTER READABLE MEDIUM

(71) Applicant: TOYOTA JIDOSHA KABUSHIKI KAISHA, Toyota (JP)

(72) Inventor: Masahiro Takahashi, Nagakute Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 236 days.

(21) Appl. No.: 17/699,721

(22) Filed: Mar. 21, 2022

(65) Prior Publication Data

US 2022/0308590 A1  Sep. 29, 2022

(30) Foreign Application Priority Data

Mar. 24, 2021  (JP) .................. 2021-049879

(51) Int. Cl.
  *G05D 1/00* (2024.01)
  *G05D 1/02* (2020.01)
  *G05D 1/12* (2006.01)

(52) U.S. Cl.
  CPC ......... *G05D 1/0214* (2013.01); *G05D 1/0094* (2013.01); *G05D 1/12* (2013.01)

(58) Field of Classification Search
  CPC ...... G05D 1/0214; G05D 1/0094; G05D 1/12; G05D 2201/0211; G05D 2201/0217
  See application file for complete search history.

(56) References Cited

U.S. PATENT DOCUMENTS 8,583,282 B2 * 11/2013 Angle .................. G05D 1/0246
                                                    700/245
2009/0198380 A1 * 8/2009 Friedman ................ A47L 9/009
                                                    901/1
(Continued)

FOREIGN PATENT DOCUMENTS

JP    2011054082 A  *  3/2011
JP    2012161901 A  *  8/2012
(Continued)

OTHER PUBLICATIONS

Machine Translation: JP-2017170568-A (Year: 2017).*
Machine Translation: JP-2012161901-A (Year: 2012).*
Machine Translation: JP-2011054082-A (Year: 2011).*

*Primary Examiner* — Anne Marie Antonucci
*Assistant Examiner* — Connor L Knight
(74) *Attorney, Agent, or Firm* — Dinsmore & Shohl LLP

(57) ABSTRACT

The embodiments relate to a traveling apparatus adapted to perform communication sequentially with a plurality of moving objects. The traveling apparatus includes: a moving object data acquisition unit configured to acquire moving object data including at least location information of a plurality of moving objects present within a predetermined distance range in the periphery of the traveling apparatus; a target determination unit configured to determine a target of communication from among the plurality of the moving objects; and an operation control unit configured to move, based on the moving object data, the traveling apparatus in a direction in which there is few moving objects while maintaining the state in which the traveling apparatus performs communication with the target of communication.

9 Claims, 6 Drawing Sheets

(56) References Cited

U.S. PATENT DOCUMENTS

| | | | |
|---|---|---|---|
| 2018/0213597 A1* | 7/2018 | Hayama | H04W 4/027 |
| 2019/0008248 A1* | 1/2019 | Kovtun | G05D 1/0088 |
| 2020/0225053 A1* | 7/2020 | Rus | G05D 1/0214 |
| 2021/0402600 A1* | 12/2021 | Kim | B25J 9/1666 |

FOREIGN PATENT DOCUMENTS

| | | | |
|---|---|---|---|
| JP | 2017170568 A | * | 9/2017 |
| JP | 2019-144612 A | | 8/2019 |

* cited by examiner

TRAVELING APPARATUS, CONTROL METHOD, AND NON-TRANSITORY COMPUTER READABLE MEDIUM

CROSS REFERENCE TO RELATED APPLICATIONS

This application is based upon and claims the benefit of priority from Japanese patent application No. 2021-049879, filed on Mar. 24, 2021, the disclosure of which is incorporated herein in its entirety by reference.

BACKGROUND

The present disclosure relates to a traveling apparatus, a control method, and a program.

Japanese Unexamined Patent Application Publication No. 2019-144612 (Patent Literature 1) discloses a traveling apparatus adapted to select, based on a result of analysis of a region direction vector of a flow formed by people (moving objects) present in the peripheral region of the traveling apparatus, to travel along with the flow of the people. Such a traveling apparatus is capable of traveling, even in an environment where there are many people in the area around the traveling apparatus, to a destination while the possibility of it being stopped is suppressed by it moving along with the flow formed by those people.

SUMMARY

An object of the traveling apparatus disclosed in Patent Literature 1 is to move to a destination smoothly by traveling along with the flow of people who are present in the area around the traveling apparatus. Therefore, the traveling apparatus is not designed in consideration of the action of performing communication with only the target people among a plurality of people under a state in which the traveling apparatus is surrounded by the plurality of people.

The present disclosure has been made in view of the problem mentioned above, and an object of the present disclosure is to provide a traveling apparatus adapted to perform communication smoothly only with a target moving object among a plurality of moving objects under an environment in which the plurality of moving objects are present in the area around the traveling apparatus, a control method, and a program.

A first aspect of the present disclosure is a traveling apparatus adapted to sequentially perform communication with a plurality of moving objects, the traveling apparatus including:

a moving object data acquisition unit configured to acquire moving object data including at least location information of the plurality of the moving objects present within a predetermined distance range in the periphery of the traveling apparatus;

a target determination unit configured to determine a target of communication from among the plurality of moving objects; and an operation control unit configured to move, based on the moving object data, the traveling apparatus in a direction in which there is few moving objects while maintaining the state in which the traveling apparatus performs communication with the target of communication.

A second aspect of the present disclosure is a control method for a traveling apparatus adapted to sequentially perform communication with a plurality of moving objects, the control method including:

acquiring moving object data including at least location information of the plurality of the moving objects present within a predetermined distance range in the periphery of the traveling apparatus;

determining a target of communication from among the plurality of the moving objects; and moving, based on the moving object data, the traveling apparatus in a direction in which there is few moving objects while maintaining the state in which the traveling apparatus performs communication with the target of communication.

A third aspect of the present disclosure is to provide a program for causing a computer to execute the aforementioned control method.

According to the present disclosure, a traveling apparatus adapted to perform communication smoothly only with a target moving object among a plurality of moving objects under an environment in which the plurality of moving objects are present in the area around the traveling apparatus, a control method, and a program can be provided.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
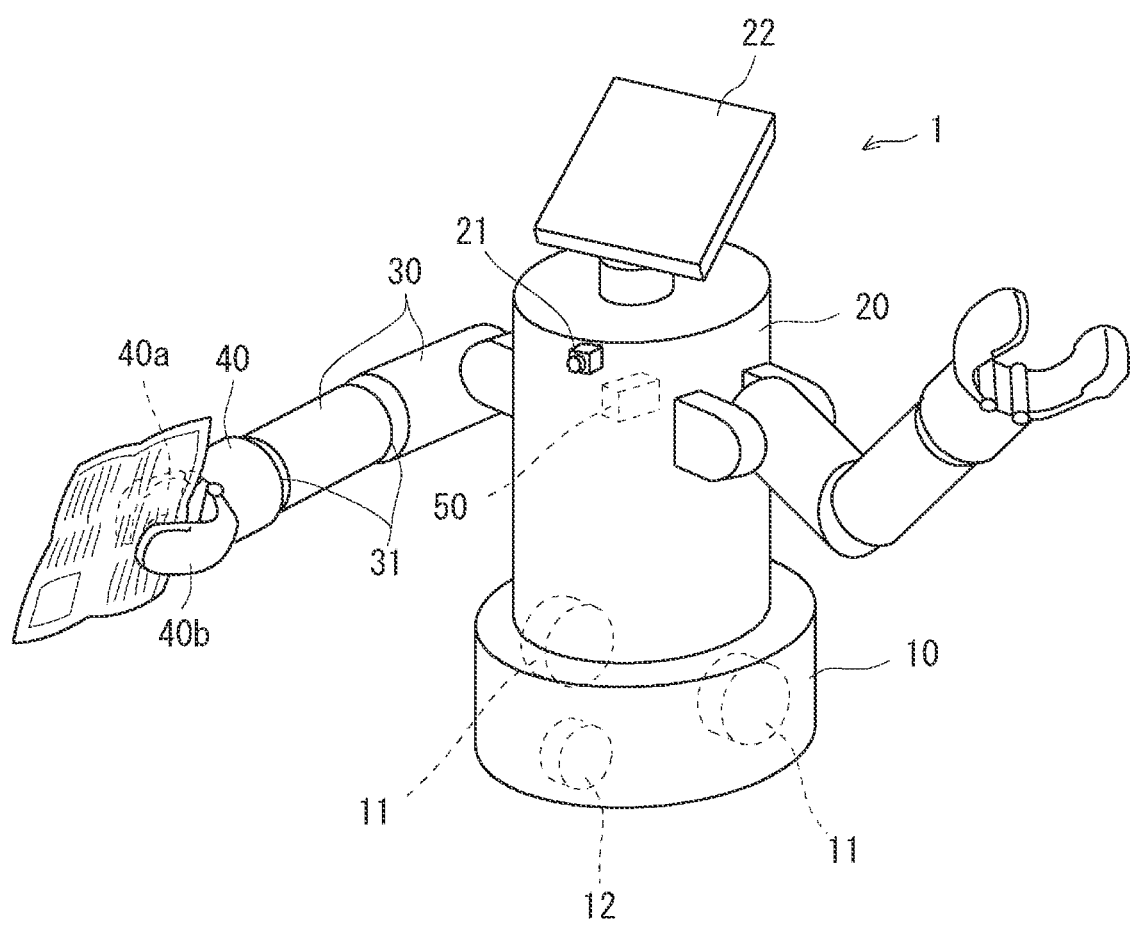
FIG. 1 is a schematic diagram showing a configuration of a traveling apparatus according to an embodiment.

Hereinbelow, embodiments of the present disclosure will be described with reference to the drawings. Note that the following description and the attached drawings are shortened and simplified where appropriate to clarify the explanation. In the drawings, the identical reference symbols denote identical structural elements and the redundant explanation thereof is omitted where necessary. Note the present disclosure according to the claims is not intended to be limited by the embodiments described below, and not all of the components/structures described in the embodiments are necessarily indispensable for solving the problem.

A traveling apparatus according to an embodiment is a traveling apparatus capable of performing communication sequentially with a plurality of moving objects. Here, as an example of a traveling apparatus that performs communication with a moving object, a robot that provides a service of distributing items to people will be described. In a state in which the robot is not moving, when many people crowds around the robot to try to get the items, a dangerous situation occurs where people come in physical contact with one another or with the robot.

Therefore, it is conceivable to determine the situation in the area around the robot from information of a camera or a sensor mounted on the robot and remotely control the robot. However, it requires much labor to avoid a crowd or to move the robot to a position where it can respond to each of a plurality of people in order, and it is not possible for the user to concentrate on making the robot perform the intended operation (for instance, distributing items to people). Therefore, the inventors of the present disclosure have worked out a technique of having a robot distribute items to only to the target people among a plurality of people under an environment in which the plurality of people are present in the area around the robot and sequentially distributing the items to more than one people in a smooth manner.

First, a configuration of a robot 1 as a traveling apparatus according to the present embodiment will be described. It is assumed that a side of the robot 1 that faces a person and from which services such as distribution of items are provided is the front (the front side) of the robot 1. FIG. 1 is a schematic diagram showing a configuration of the robot 1 according to the embodiment. As shown in FIG. 1, the robot 1 includes a cart part 10, a main body part 20, a robot arm 30, and a robot hand 40.

The cart part 10 is a moving mechanism for moving on a traveling surface. The cart part 10 is provided with three wheels, each of which coming in contact with the ground. An example shown in FIG. 1, two driving wheels 11 and one driven wheel 12 are provided. The two driving wheels 11 are arranged so that the respective axes of rotation coincide with each other. Each of the driving wheels 11 are rotationally driven independently of each other by a motor (not shown). The driven wheels 12 follow the moving direction of the cart part 10. The robot 1 travels straight ahead when, for instance, the two driving wheels 11 are rotated in the same direction at the same rotation speed. Note that the number of wheels is not limited to that given in this example, and all of the wheels may be the driving wheels.

An external sensor 21 is provided to the front side of the main body part 20. The external sensor 21 generates data (moving object data) including at least location information of a plurality of people (moving objects) that are present in the periphery of the robot 1 within a predetermined distance range. As the external sensor 21, a camera, for instance, can be employed. The camera can capture an image of the peripheral region to the front of the robot 1 and generate data indicating the locations of people from the image data. The camera can be a stereo camera having a distance measurement function.

Note that the external sensor 21 may be configured to be swingable about the roll axis and the yaw axis with respect to the main body part 20. With this configuration, the image pick-up direction can be changed without the robot 1 having to move. Note that the number of the external sensors 21 and the installation positions thereof are not limited to those of the aforementioned example.

Further, the external sensor 21 may be a distance measurement sensor (e.g. LRF (Laser rangefinder), LIDAR (Light Detection and Ranging)) that specifies the location of the robot 1 and detects the surrounding environment of the robot 1 based on the distance measurement performed using optical waves. Further, as the external sensor 21, it is possible to employ a sonar, a millimeter wave laser, or the like that captures electromagnetic waves, sound waves, or the like from the periphery of the robot and detects the objects around the robot.

The main body part 20 supports the robot arm 30. In the example of FIG. 1, one robot arm 30 is provided to each side part of the main body part 20. The external sensor 21 is installed at a position where it can look out over the peripheral space to the front of the robot 1 including the operating ranges of the robot arm 30 and the robot hand 40 of the main body part 20.

The robot arm 30 includes a plurality of links, and in the example of FIG. 1, the robot arm 30 includes two links. Each joint part 31 (a wrist joint, an elbow joint, a shoulder joint, or the like) connects the links with each other in a rotatable manner. The robot arm 30 can take various postures by driving an actuator disposed to the joint part 31.

The robot hand 40 is connected to a tip end part of the robot arm 30. The robot hand 40 includes a first finger 40a and a second finger 40b each provided to the tip end part. The robot can hold the item to be distributed to people by being operated in such a manner that the first finger 40a and the second finger 40b approach each other. The robot arm 30 and the robot hand 40 configure a distribution mechanism for distributing items to people.

The robot 1 can be configured to be able to perform two-way communication with a remote control terminal (not shown) via WAN (Wide Area Network) such as the internet. The robot 1 can provide a service of distributing items to people based on an instruction from the remote control terminal. Further, a control unit 50 is provided to the main body part 20. The control unit 50 includes a controller to be described later for controlling the operation of the robot 1, a memory, and the like. Note that a display panel 22 that is an example of a user interface may be provided to the main body part 20. It is possible to accept input of instructions from the user by disposing a touch panel to a display surface of the display panel 22.

Figure 2:
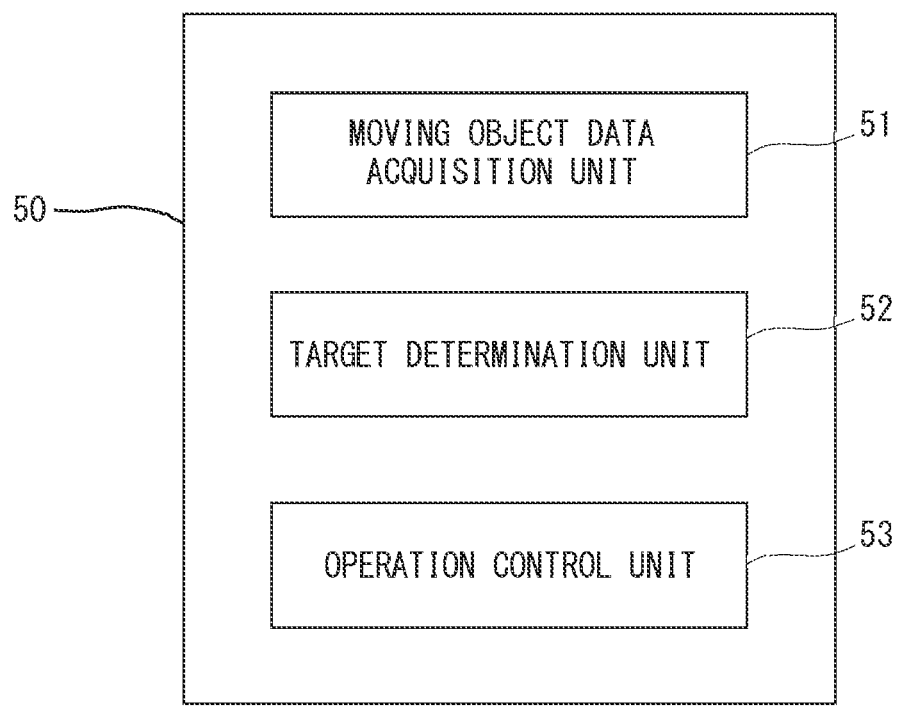
FIG. 2 is a functional block diagram of the traveling apparatus according to the embodiment.

FIG. 2 is a functional block diagram of the robot 1 according to the embodiment. The control unit 50 includes, for instance, a CPU (Central Processing Unit) as the controller. The CPU reads out and executes a control program stored in the memory whereby the control program causes the hardware such as the CPU to function as each of the functional units described below.

Each of the functional units includes a moving object data acquisition unit 51, a target determination unit 52, and an operation control unit 53. The moving object data acquisition unit 51 acquires the moving object data acquired by the external sensor 21 including at least the location information of a plurality of moving objects that are present in the periphery of the robot 1 within a predetermined distance range. For example, the moving object data acquisition unit 51 can acquire the moving object data indicating the location of each of the plurality of people present within a circle of a given radius centered on the robot 1.

The target determination unit 52 determines the target of communication from among the plurality of people. The target determination unit 52 determines the person closest in distance to the robot among the plurality of people included in the captured image data as the target of distribution of the item. Further, after the item is distributed to the determined target of distribution, the target determination unit 52 determines the person next closest in distance from the robot other than the one who has been distributed the item as a new target of distribution. Note that the method of determining the target to which a service is provided is not limited to the aforementioned example.

The operation control unit 53 first determines whether or not it is necessary to move the robot 1. Specifically, the operation control unit 53 calculates the density of people in the area around the robot and/or the size of the area in which people are present around the robot (the size of the crowd) based on the location information of the plurality of people in the moving object data acquired by the moving object data acquisition unit 51. Then, the operation control unit 53 performs the processing of moving the traveling apparatus when the calculated density and/or area is equal to or greater than the predetermined value.

Then, the operation control unit 53 moves the robot 1 to a direction in which there is few people while performing the operation of distributing the items to the targets of distribution based on the moving object data. With this configuration, it is possible to make the people crowding around the robot 1 to gradually line up as the robot 1 moves. Accordingly, it is possible to distribute, in order, an item to each of a plurality of people who are lining up.

Figure 3:
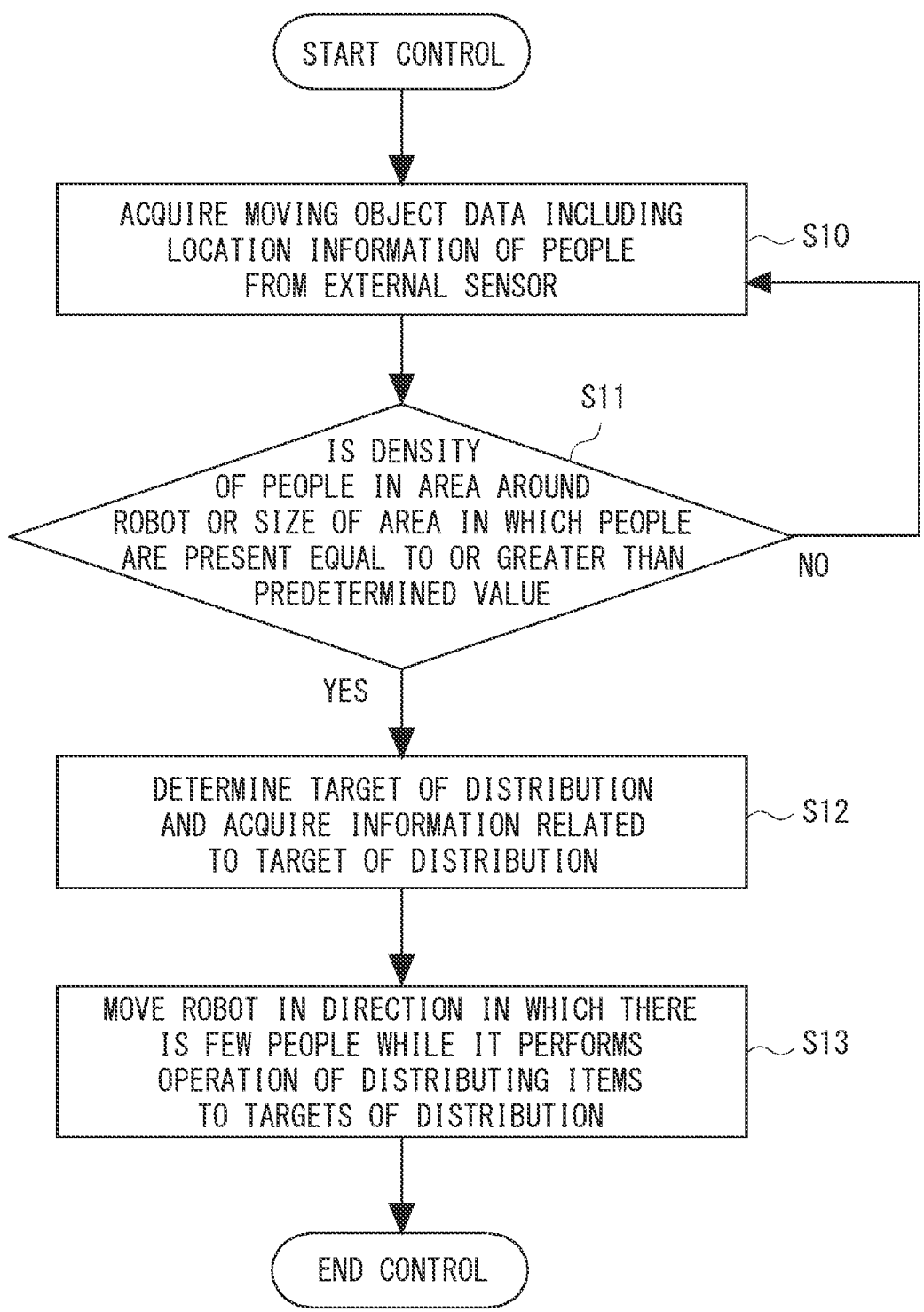
FIG. 3 is a flowchart explaining an example of a method for controlling the traveling apparatus according to the embodiment.

FIG. 3 is a flowchart explaining an example of a method for controlling the traveling apparatus according to the embodiment. As shown in FIG. 3, first, the moving object data of the people in the area around the robot 1 is acquired from the external sensor 21 (Step S10). Then, based on the moving object data, the density of people in the area around the robot and/or the size of the area in which people are present around the robot is calculated, and a determination is made as to whether the calculated density and/or area is equal to or greater than the predetermined value (Step S11).

When the calculated density and/or area is below the predetermined value (Step S11, NO), the processing returns to Step S10 and the moving object data is re-acquired. When, on the other hand, when the calculated density and/or area is equal to or greater than the predetermined value (Step S11, YES), the robot 1 determines the target of distribution of the item and acquires the information related to the determined target of distribution (Step S12).

Note that as described above, it is possible to determine the person closest in distance to the robot as the target of distribution of the item. The information related to the target of distribution is information indicating the location and the orientation of the target of distribution currently captured by the external sensor 21, for example, information obtained from the image data picked-up by the external sensor 21, information on the angle of the joint part 31, and the like.

Then, using the information related to the target of distribution obtained in Step S12, the robot 1 is moved in a direction in which there is few people while it performs the operation of distributing items to the targets of distribution (Step S13). For instance, the robot 1 can move backward in the direction in which the density of people in the area around the robot is low while maintaining the state in which the robot 1 is facing the target of distribution. That is, while the robot 1 is on the move, the posture of the tip end of the robot hand 40 of the robot 1 is adjusted so that the tip end of the robot hand 40 is kept facing the target of distribution.

Figure 4A:
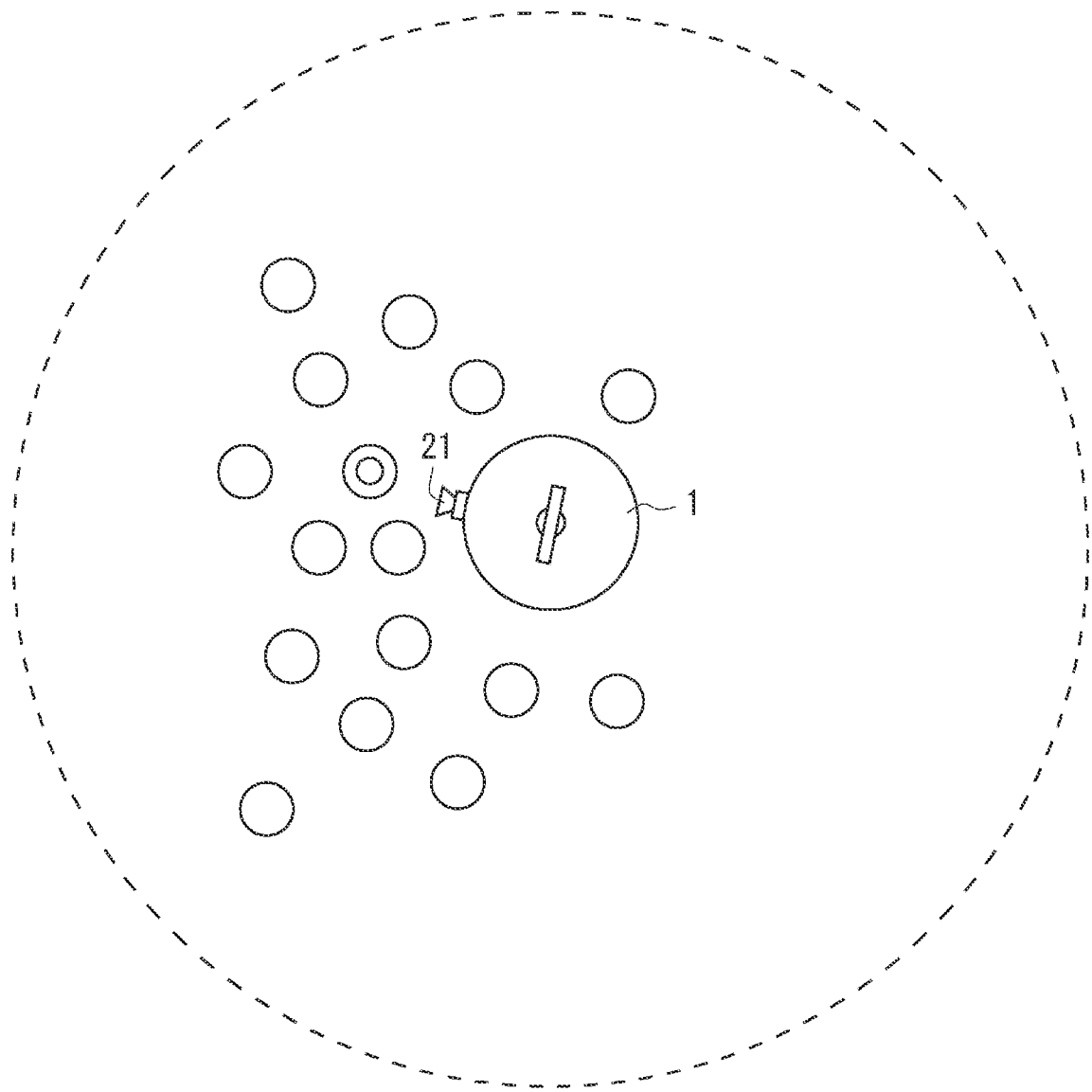
FIG. 4A is a diagram explaining an example of an operation of the moving apparatus according to the embodiment.
Figure 4B:
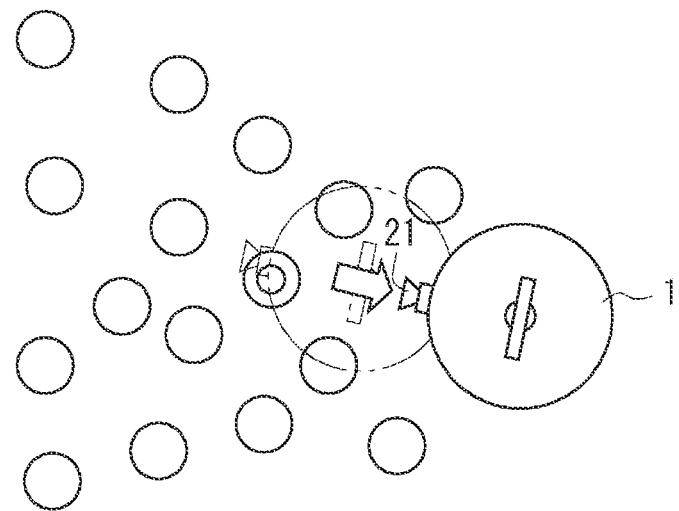
FIG. 4B is a diagram explaining an example of an operation of the moving apparatus according to the embodiment.
Figure 4C:
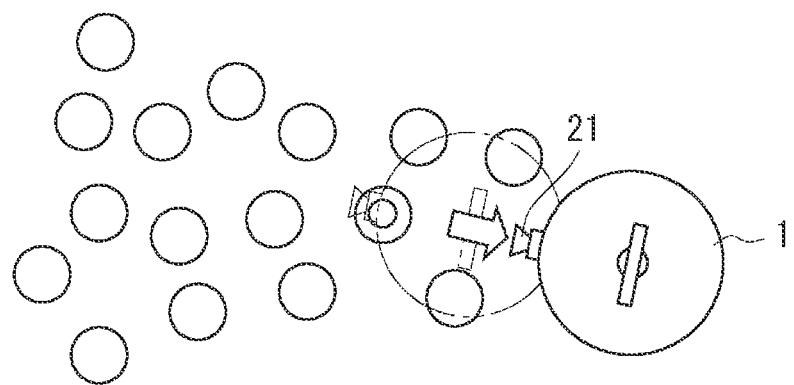
FIG. 4C is a diagram explaining an operation of the moving apparatus according to the embodiment.

FIGS. 4A to 4C show examples of determining the direction in which the robot 1 moves in accordance with the density of people in the area around the robot. These figures indicate the positional relationship between the robot 1 and the plurality of people present in the periphery of the robot 1. In these figures, the circles indicate people, and the double circles indicate people who are the target of distribution.

FIG. 4A indicates the state in which the control shown in FIG. 3 is started. It is assumed that a predetermined time has elapsed in succession as the state changes from that shown in FIG. 4A to that shown in FIG. 4C. In FIG. 4B, the location at which the robot 1 was present at the time of FIG. 4A is shown by a chain double-dashed line. Further, in FIG. 4C, the location at which the robot 1 was present at the time of FIG. 4B is shown by a chain double-dashed line.

As shown in these figures, the robot 1 distributes the item to the target of distribution while maintaining the state in which robot 1 is facing the target of distribution and moves backward in the direction shown by the white arrow in which the density of people in the area around the robot is low. Accordingly, the plurality of people trying to get the items move in front of the robot 1 so as line up with the target of distribution leading the line whereby the size of the crowd becomes smaller. As described above, by automatically moving the robot 1 in a direction in which there is few people using an external sensor, it is possible to maintain provision of the services to people in a crowded place.

Note that as shown in FIGS. 4B and 4C, when a person appears at a location closer in distance to the robot 1 than that of the currently determined target of distribution while the robot is moving backward, there is no need to pay attention to the person who has appeared at a location closer in distance to the robot until the item has been distributed to the currently determined target of distribution. However, it is possible to change the target of distribution so that the item is distributed first to a person who has appeared at a location closest in distance from the robot 1.

Further, the moving object data acquisition unit 51 may further acquire the motion vector of a plurality of people present in the periphery of the robot 1 within a predetermined distance range as the moving object data. The motion vector can be acquired by, for instance, performing an optical flow analysis between the previous image and the current image. The operation control unit 53 can analyze the motion vector and perform the operation of distributing the item to the target of distribution while maintaining the distance between the robot 1 and the target of distribution to fall within the predetermined range for distributing the item. At the same time, the operation control unit 53 can move the robot 1 in a direction in which there is few people so as to be distant from those people other than the target of distribution.

As described above, by maintaining the distance between the robot 1 and the target of distribution to fall within the predetermined range for distributing the item, it is possible to smoothly perform the operation of distributing the item to the target of distribution. Further, by moving the robot 1 in a direction in which there is few people so as to be distant from the people other than the target of distribution, it is possible to suppress interferences to the operation of distribution caused by the people other than the target of distribution.

Figure 5:
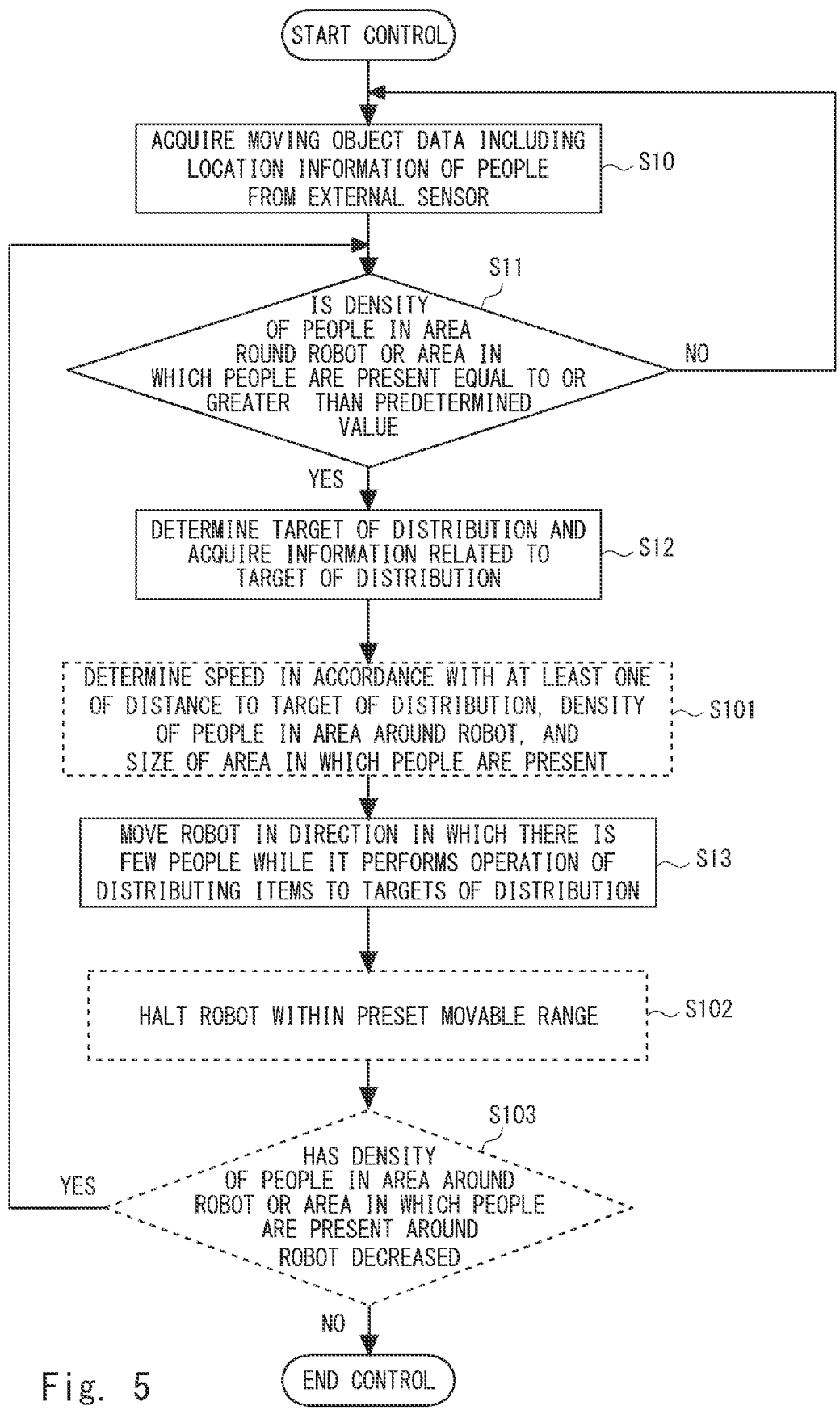
FIG. 5 is a flowchart explaining another example of a method for controlling the traveling apparatus according to the embodiment.

FIG. 5 is a flowchart explaining another example of a method for controlling the traveling apparatus according to the embodiment. In FIG. 5, in addition to the flow chart shown in FIG. 3, the following three steps are added.

Step S101: Determine the moving speed of the traveling apparatus in accordance with at least one of the distance to the target of distribution, the density of people in the area around the robot, and the size of the area in which people are present around the robot.

Step S102: Halt the robot 1 within the preset movable range.

Step S103: Determine whether or not the density of people in the area around the robot or the size of the area in which people are present around the robot has decreased.

Note that in FIG. 5, the steps that are the same as those of FIG. 3 are denoted by the same reference symbols as those denoting the corresponding steps in FIG. 3.

Referring to FIG. 5, first, the moving object data of the people in the area around the robot is acquired from the external sensor 21 (Step S10). Then, based on the moving object data, the density of people in the area around the robot and/or the size of the area in which people are present around the robot is calculated and a determination is made as to whether the calculated density and/or area is equal to or greater than the predetermined value (Step S11).

Then, after the robot 1 determines the target of distribution of the item and acquires the information related to the determined target of distribution (Step S12), Step S101 is executed. In step S101, when, for instance, the distance between the robot 1 and the target of distribution is shorter than the predetermined value or the size of the area in which the crowd is present (hereafter, the size of the area of the crowd) is large, the moving speed of the robot 1 can be accelerated. On the contrary, when the density of people in the area around the robot is low and the size of the area of the crowd is small, the moving speed of the robot 1 may be slowed down. As described above, by changing the moving speed of the robot 1, it is possible to appropriately control the time taken to make the people in the crowd line up.

Then, using the information related to the target of distribution obtained in Step S12, the robot 1 is moved at the speed calculated in Step S101 in a direction in which there is few people while the robot 1 performs the operation of distributing items to the targets of distribution (Step S13).

Then, the robot 1 is halted within the preset movable range (Step S102). As shown by the dotted lines in FIG. 4A, for instance, a circle of a given radius centered on the robot 1 when the control is started can be set as the movable range. The operation control unit 53 can stop the robot 1 from moving before the robot 1 reaches the outer edge of the circle.

Further, the operation control unit 53 can change the moving direction of the robot 1 when the robot 1 reaches the outer edge of the circle. At this time, the operation control unit 53 may move the robot 1 along the outer edge of the circle. As described above, by performing control so as to halt the robot 1 within the predetermined range, it is possible to prevent deviation of the robot 1 from the indoor or outdoor event site or the like.

Note that the movable range is not limited to a circular range. For instance, the movable range may be any other shape that matches the shape of the aforementioned event site.

After the robot 1 is moved, the moving object data of the people in the area around the robot is re-acquired from the external sensor 21 and the density of people in the area around the robot and/or the size of the area around the robot in which people are present is calculated. Then, a determination is made as to whether the density of people in the area around the robot or the size of the area around the robot in which people are present has decreased (Step S103). When the density of people in the area around the robot or the size of the area around the robot in which people are present has not decreased (NO), it is assumed that a dangerous situation such as people coming in physical contact with one another occurs. In such a case, the control is ended and at least one of the operations of the robot 1 is ended.

For instance, when the dangerous situation of the crowd is not improved even when the robot 1 is moved for the predetermined time or by the predetermined distance, distribution of the item can be temporary suspended. When, on the other hand, when the density of people in the area around the robot or the size of the area around the robot in which people are present has decreased (YES), the processing returns to Step S11 and a determination is made as to whether the density of people in the area around the robot and/or the size of the area around the robot in which people are present is equal to or greater than the predetermined value and the following processing is continued.

Note that while in the example shown in FIG. 5, all of the aforementioned three steps are incorporated in the method for controlling the robot 1, any one thereof or any combination thereof may be incorporated. Further, the order in which the steps of the control method is performed is not limited to that mentioned above. For instance, the order in which the determination of the target of distribution (Step S12) and the determination of the moving speed (Step S101) are performed may be reversed.

As described above, according to the embodiments, by automatically moving the robot 1 in the direction in which there are few people using the external sensor, it is possible to have the plurality of people who are stagnant in the area around the robot to line up. With this configuration, it is possible for the robot to provide its services sequentially and smoothly.

The program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

Note that the present disclosure is not limited to the aforementioned embodiments and can be modified as appropriate without departing from the gist of the present disclosure. The way of performing communication with the moving object is not limited to distributing items to people as described above, and may include, for instance, feeding animals or the like.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A traveling apparatus that sequentially performs communication with a plurality of moving objects, the traveling apparatus comprising:
   a main body part,
   a distribution mechanism including an arm connected to the main body, and a hand, including a tip end, connected to the arm, the distribution mechanism distributes items to the moving objects to perform the communication with the plurality of moving objects;

a cart part including a drive wheel configured to move the traveling apparatus; and a central processing unit configured to:
- acquire moving object data including at least location information of the plurality of the moving objects present within a predetermined distance range in a periphery of the traveling apparatus;
- determine a target of communication from among the plurality of moving objects;
- calculate, based on a location of the plurality of moving objects, a density of the moving objects and/or a size of an area in which the moving objects are present; and
- control movement of the drive wheel, based on the moving object data, to move the traveling apparatus, when the density of the moving objects and/or the size of the area in which the moving objects are present is equal to or greater than a predetermined value, in a direction away from the area in which the density of the moving objects and/or the size of the area in which the moving objects are present is equal to or greater than the predetermined value, while maintaining a state in which the traveling apparatus performs communication with the target of communication and in which a posture of the tip end of the hand is adjusted to maintain the tip end facing the target of communication.

2. The traveling apparatus according to claim 1, wherein the central processing unit is configured to further acquire a motion vector of the plurality of moving objects as the moving object data, and
the central processing unit is configured to control movement of the traveling apparatus in the direction so as to be distant from the moving objects other than those of the target of communication while performing the communication maintaining a state in which a distance between the traveling apparatus and the target of communication falls within a predetermined range and in which a posture of the tip end of the hand is adjusted to maintain the tip end facing the target of communication.

3. The traveling apparatus according to claim 1, wherein the central processing unit is configured to determine a moving speed of the traveling apparatus in accordance with at least one of a distance to the target of communication, the density of the moving objects, and the size of the area in which the moving objects are present.

4. The traveling apparatus according to claim 1, wherein the central processing unit is configured to halt movement of the traveling apparatus at a location not beyond a preset moveable range.

5. The traveling apparatus according to claim 1, wherein the central processing unit is configured to controls a change in a posture of the traveling apparatus such that the part of the distribution mechanism that holds the items is kept facing the target of communication.

6. The traveling apparatus according to claim 1, wherein the central processing unit is configured to determine, from among the plurality of the moving objects, the target of communication which is closest in distance to the traveling apparatus.

7. A control method for a traveling apparatus that sequentially performs communication with a plurality of moving objects, the control method comprising:

acquiring moving object data including at least location information of the plurality of the moving objects present within a predetermined distance range in a periphery of the traveling apparatus;
determining a target of communication from among the plurality of the moving objects;
calculating, based on a location of the plurality of the moving objects, a density of the moving objects and/or a size of an area in which the moving objects are present; and
moving, based on the moving object data, the traveling apparatus, when the density of the moving objects and/or the size of the area in which the moving objects are present is equal to or greater than a predetermined value, in a direction away from the area in which the density of the moving objects and/or the size of the area in which the moving objects are present is equal to or greater than the predetermined value, while maintaining a state in which the traveling apparatus performs communication with the target of communication and in which a posture of the tip end of the hand is adjusted to maintain the tip end facing the target of communication.

8. A non-transitory computer readable medium storing a program for causing a computer to execute the control method according to claim 7.

9. A system that sequentially performs communication with a plurality of moving objects using a traveling device, comprising:
a main body part;
a distribution mechanism including an arm connected to the main body, and a hand, including a tip end, connected to the arm, the distribution mechanism distributes items to the moving objects to perform the communication with the plurality of moving objects, and
a cart part including a drive wheel configured to move the traveling apparatus; and
a central processing unit configured to:
acquire moving object data including at least location information of the plurality of the moving objects present within a predetermined distance range in a periphery of the traveling apparatus;
determine a target of communication from among the plurality of moving objects;
calculate, based on a location of the plurality of moving objects, a density of the moving objects and/or a size of an area in which the moving objects are present; and
control movement of the drive wheel, based on the moving object data, to move the traveling apparatus, when the density of the moving objects and/or the size of the area in which the moving objects are present is equal to or greater than a predetermined value, in a direction away from the area in which the density of the moving objects and/or the size of the area in which the moving objects are present is equal to or greater than the predetermined value, while maintaining a state in which the traveling apparatus performs communication with the target of communication and in which a posture of the tip end of the hand is adjusted to maintain the tip end facing the target of communication.

* * * * *